US010820061B2

(12) United States Patent
Moran et al.

(10) Patent No.: US 10,820,061 B2
(45) Date of Patent: Oct. 27, 2020

(54) APPARATUS, SYSTEMS AND METHODS FOR PRESENTATION OF MEDIA CONTENT USING AN ELECTRONIC BRAILLE DEVICE

(71) Applicant: Dish Technologies L.L.C., Englewood, CO (US)

(72) Inventors: Lawrence Moran, Aurora, CO (US); Brandon Halper, Aurora, CO (US)

(73) Assignee: DISH Technologies L.L.C., Englewood, CO (US)

(*) Notice: Subject to any disclaimer, the term of this patent is extended or adjusted under 35 U.S.C. 154(b) by 776 days.

(21) Appl. No.: 15/295,853

(22) Filed: Oct. 17, 2016

(65) Prior Publication Data
US 2018/0109849 A1    Apr. 19, 2018

(51) Int. Cl.
| | |
|---|---|
| *H04N 21/488* | (2011.01) |
| *H04N 21/41* | (2011.01) |
| *H04N 21/81* | (2011.01) |
| *G11B 27/00* | (2006.01) |
| *H04N 21/433* | (2011.01) |

(Continued)

(52) U.S. Cl.
CPC ....... *H04N 21/4884* (2013.01); *G11B 27/005* (2013.01); *G11B 27/34* (2013.01); *H04N 21/234336* (2013.01); *H04N 21/4126* (2013.01); *H04N 21/4333* (2013.01); *H04N 21/8133* (2013.01)

(58) Field of Classification Search
CPC ............................ G09B 21/004; G09B 21/007
See application file for complete search history.

(56) References Cited

U.S. PATENT DOCUMENTS

| | | |
|---|---|---|
| 8,135,577 B2 | 3/2012 | Seymour et al. |
| 8,325,883 B2 | 12/2012 | Schultz et al. |

(Continued)

FOREIGN PATENT DOCUMENTS

| | | |
|---|---|---|
| WO | 2004080025 | 9/2004 |
| WO | 2014210034 | 12/2014 |

OTHER PUBLICATIONS

Jamieson, Robert L., Movie Theater Technology Projects Access to Vision-,Hearing Impaired, Seattle Post Intelligencer, Feb. 25, 1999, Seattle WA, 3 pages.

(Continued)

*Primary Examiner* — Thomas J Hong
(74) *Attorney, Agent, or Firm* — Perkins Coie LLP

(57) ABSTRACT

Systems and methods are operable to communicate information about media device operations to an electronic Braille device. An exemplary embodiment receives a media content event at a media device, wherein the media content event is presented by at least one component of a media content presentation system to at least one visually impaired user; generates a supplemental Braille text information message in response to an operation of the media device that affects the presentation of the media content event, wherein the supplemental Braille text information message is based on text that indicates at least one attribute of the operation of the media device; and communicates the supplemental Braille text information message to the electronic Braille device, wherein the supplemental Braille text information message is presented by the electronic Braille device as tactile information that is sensed by the visually impaired user.

15 Claims, 3 Drawing Sheets

(51) Int. Cl.
    *H04N 21/2343*     (2011.01)
    *G11B 27/34*     (2006.01)

(56)     References Cited

U.S. PATENT DOCUMENTS

| | | |
|---|---|---|
| 8,467,275 B2 | 6/2013 | Emerson et al. |
| 8,497,939 B2 | 7/2013 | Cuttner |
| 8,869,222 B2 | 10/2014 | Winograd et al. |
| 8,943,021 B2 | 1/2015 | Cuttner |
| 9,401,099 B2 | 7/2016 | Eckhardt et al. |
| 2004/0008277 A1 | 1/2004 | Nagaishi et al. |
| 2004/0044532 A1 | 3/2004 | Karstens |
| 2005/0172232 A1 | 8/2005 | Wiseman |
| 2008/0055245 A1* | 3/2008 | Migliacio ............... G06F 3/016 345/158 |
| 2014/0040189 A1* | 2/2014 | Cuttner ............... G06F 16/7844 707/610 |
| 2014/0281997 A1 | 9/2014 | Fleizach et al. |
| 2015/0098018 A1 | 4/2015 | Starling et al. |
| 2015/0245087 A1 | 8/2015 | Winarski et al. |

OTHER PUBLICATIONS http://newmexico.networkofcare.org/veterans/assistive/product_detail.aspx?id=15193&pid=84053&term=Closed%20Caption%20System&c=Deaf/%20And%20Hard%20of%20Hearing, Aug. 11, 2016, 1 page.
https://www.youtube.com/watch?v=08tyYAhPuVU, Jul. 28, 2012.

\* cited by examiner

APPARATUS, SYSTEMS AND METHODS FOR PRESENTATION OF MEDIA CONTENT USING AN ELECTRONIC BRAILLE DEVICE

BACKGROUND

Media devices, such as a set top box, a stereo, a television, a computer system, a game system, or other electronic media device may be configured to receive a broadcast of media content that has a video portion which is presented on a display to a viewing user of the media device. Typically, the broadcast media content comprises a series of media content events. A media content event often presents theme-based visual and audio content to a user for their enjoyment and/or for informative purposes. Examples of such theme-based media content events include movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

Presentation of media content events on a variety of types of media presentation systems is well known. In some situations, a visually impaired user may view and/or listen to media content with the supplemental assistance of an electronic Braille device. In many instances, the visually impaired user is able to distinguish, at least to some degree, the video portion of presenting media content. However, the visually impaired user may not have the ability to discern finer details of the video portion of a media content event, and in particular, faces of actors, scene details, and/or text in the presented video content.

In many instances, the presented media content event contains a closed captioning stream that presents text describing the presenting media content event. Such closed captioning text may be converted into information that is presentable to the visually impaired user who is using their electronic Braille device. Alternatively, or additionally, other information may be converted into text-based information that is presentable by the electronic Braille device, such as narrative descriptions of the visual portion of the presenting media content, descriptions of actors, and/or descriptions of other information of interest.

Typically, the text-based information presented to the visually impaired user via their electronic Braille device is synchronized to the presentation of the video and/or audio portions of the presenting media content. Accordingly, information that the visually impaired user is received at or about the same time as the corresponding portion of the media content event is being presented.

An example text-based assistive program that converts text-based into information that is used by an electronic Braille device may be found in U.S. Pat. No. 8,497,939 to Cuttner, which is incorporated by reference herein in its entirety. Thus, the visually impaired user is more able to appreciate presented media content in view of the supplemental text-based information that is converted into the text-based Braille content, and then presented to the visually impaired user by their electronic Braille device.

As is known in the arts, various trick functions are available to the user of a media device and/or a media presentation system component which is presenting the media content event. The various presentation trick play functions permit the user of a media device to control the presentation of a media content event. The presentation trick play functions control the flow of the presenting media content event (the video frames and the associated audio content) out from the content buffer of the media device to the components of the media content presentation system (such as the display that presents the video frames and speakers that synchronously present the associated audio content).

An example presentation trick play function is the "pause" function wherein presentation of the video portion of the media content event that is currently being presented on the display is temporarily halted in response to a user request. During a pause operation initiated by the user, a single selected video frame may be presented on the display (thus showing a single still image of the video portion of the media content event). Presentation of the audio portion is also halted. Thus, the user views the single still image presented on the display, typically the last video frame output from the content buffer, and hears no audio content. Presentation of the media content event resumes when the user initiates an end of the pause operation and/or after expiration of some predefined duration.

For the visually impaired user, such a pause of the presenting media content may be perceived when the electronic Braille device ceases to output the text-based Braille content, when they no longer hear the audio output, and/or when they no longer see the continuing video output on the display (at least to the extent that they are able to view and perceive video content). However, the visually impaired user may not readily appreciate that a pause operation has occurred (particularly if another user who is also in the media room initiates the pause operation).

A problem arises in that a failure in the operation of the electronic Braille device and/or a component of the media presentation system will also cease output of the text-based Braille content, audio output, and/or video content. Based on the output of the electronic Braille device alone, there is no difference between a failure in presentation or a pause operation. (The visually impaired user might be able to intuitively arrive at the conclusion that a pause operation has been implemented based on their sensed audio and visual stimuli.) Here, in the absence of other sensory input, the visually impaired user has no real way to discern the difference between a pause operation on the presenting media content, the failure in the operation of their electronic Braille device and/or a component of the media presentation system. Accordingly, during the duration of the pause operation, the visually impaired user may become confused and disoriented until they ascertain that a pause operation is in effect and/or until the end of the pause operation (wherein presentation of the media content event resumes).

Another presentation trick play function typically provided by a media device is a rewind function. During normal presentation of the media content event, the video frames (and the associated audio content) are sequentially and serially streamed out of the content buffer to the components of the media content presentation system. However, the output video frames (and the associated audio content) are not typically deleted, removed, or otherwise erased from the content buffer. Rather, the video frames (and the associated audio content) remain stored in the content buffer for at least some duration. When a rewind operation is initiated, the flow of presentation of the video frames is reversed such that the moving image perceived by the user is shown to be moving in a backward or reverse manner. That is, the previously presented video frames are accessed from the content buffer and are then presented sequentially in a reverse order. Audio content is typically halted during a rewind operation. The rewind operation may be performed at a normal speed (at the same rate of presentation that the video frames were initially presented), at a lower speed (slow motion reverse presentation), or at a higher speed (fast speed reverse presentation).

A rewind operation may continue up until the last buffered (stored) video frame residing in the content buffer has been presented or when the user terminates the rewind operation. When the rewind operation ends, either when there are no earlier received video frames available from the content buffer or when a user ends the rewind process, then presentation of the media content event may be resumed, or may be paused, at that point. Thus, the user may review previously presented portions of the media content event, at least to the extent that such media content remains stored in the content buffer.

For the visually impaired user, such a rewind operation of the presenting media content may be perceived when the electronic Braille device ceases to output the text-based Braille content (since the corresponding portion of the closed captioning text is halted during the rewind operation), when they no longer hear the audio output, and/or when they no longer see the continuing video output on the display (at least to the extent that they are able to view and perceive video content). Here, the visually impaired user may not readily appreciate that a rewind operation is occurring (particularly if another user who is also in the media room initiates the rewind operation). The visually impaired user may be able to intuitively arrive at the conclusion that a rewind operation has been implemented when presentation of the media content event resumes and they can again hear the audio content and when their electronic Braille device resumes output of the text-based information (and recall that they have already seen/heard the resumed portion of the media content event).

However, the visually impaired user may not readily appreciate that a rewind process has been initiated, or if the rewind operation has occurred (after it has concluded). Furthermore, the visually impaired user may not be able to differentiate the rewind process from other trick functions when their electronic Braille device resumes its output to the visually impaired user, when presentation of audio output resumes, and/or when presentation of video content resumes.

Further, assuming that the visually impaired user is able to "remember" the re-presenting output from their electronic Braille device, the re-presenting audio output from the speakers, and/or the re-presenting video content on the display, the visually impaired user may be able to intuitively determine how far back into the media content event the rewind operation went back through the media content event. However, the effort required of the visually impaired user to determine how far back the rewind operation went may cause the visually impaired user to become confused and disoriented until they can re-orient themselves after the conclusion of the rewind operation.

Further, and as noted above, a failure in the operation of the electronic Braille device and/or a failure of a component of the media presentation system will also cease output of the text-based Braille content, cease output of the audio content, and/or change presentation of the video content. Here, the visually impaired user may have no real way to discern the difference between an ongoing rewind operation of the presenting media content event and one of a pause operation, a failure in the operation of their electronic Braille device, a failure of a component of the media presentation system, and/or an operation of a different trick function. Accordingly, during the duration of the rewind operation, the visually impaired user may also become confused and disoriented until the conclusion of the rewind operation.

Another presentation trick play function typically provided by the media device is a fast forward operation. Here, the presentation rate of the video frames is increased such that the user perceives a fast forward motion of the playing of the video content. The fast forward operation may be performed by decreasing presentation time of individual video frames and/or by skipping over selected video frames (such that selected video frames are not presented). Typically, presentation of the audio content is also halted during a fast forward operation.

For the visually impaired user, such a fast forward operation of the presenting media content may be perceived when the electronic Braille device ceases to output the text-based Braille content (since the corresponding portion of the closed captioning text is halted during the fast forward operation), when they no longer hear the audio output, and/or when they no longer see the continuing video output on the display (at least to the extent that they are able to view and perceive video content). Similar to the rewind operation, the visually impaired user may not readily appreciate that a fast forward operation is occurring (particularly if another user who is also in the media room initiates the rewind operation). The visually impaired user may be able to intuitively arrive at the conclusion that a fast forward operation has been implemented when presentation of the media content event resumes based on other sensed stimuli. Further, the visually impaired user may appreciate that the fast forward process has occurred (and has concluded) when their electronic Braille device resumes its output to the visually impaired user, when presentation of audio output resumes, and/or when presentation of video content resumes. In some instances, the visually impaired user may even be able to intuitively determine how far forward into the media content event the fast forward operation went. However, the effort required of the visually impaired user to differentiate a fast forward operation, and/or to determine how far forward the fast forward operation went, may cause the visually impaired user to become confused and disoriented until they can re-orient themselves after the conclusion of the fast forward operation.

Other presentation trick play functions may also be provided for management of media content event presentation. Jump forward and jump backward trick play operations may advance or replay presentation of the media content event based on some predefined duration. Such jump forward and jump backward operations will not result in a substantial duration where the visually impaired user's electronic Braille device is not outputting the text-based Braille content. However, there will be a discernible discontinuity that is perceived by the visually impaired user since the text-based Braille content will change abruptly from a first topic to a likely unrelated second topic. Accordingly, the visually impaired user may become confused and disoriented because of a jump forward or a jump backward operation.

When the media content event is being provided by another memory medium, such trick play functions may also be available. For example, the media content event may be accessed from a digital video disc (DVR), a flash memory, or other local or remote memory medium.

Accordingly, there is a need in the art to further assist a visually impaired user who is receiving text-based Braille content from their electronic Braille device during presentation of a media content event, particularly when a trick play operation is implemented.

SUMMARY

Systems and methods that are operable to communicate information about media device operations to an electronic Braille device are disclosed. An exemplary embodiment receives a media content event at a media device, wherein the media content event is presented by at least one component of a media content presentation system to at least one visually impaired user; generates a supplemental Braille text information message in response to an operation of the media device that affects the presentation of the media content event, wherein the supplemental Braille text information message is based on text that indicates at least one attribute of the operation of the media device; and communicates the supplemental Braille text information message to the electronic Braille device, wherein the supplemental Braille text information message is presented by the electronic Braille device as tactile information that is sensed by the visually impaired user.

BRIEF DESCRIPTION OF THE DRAWINGS

Preferred and alternative embodiments are described in detail below with reference to the following drawings.

DETAILED DESCRIPTION

Figure 1:
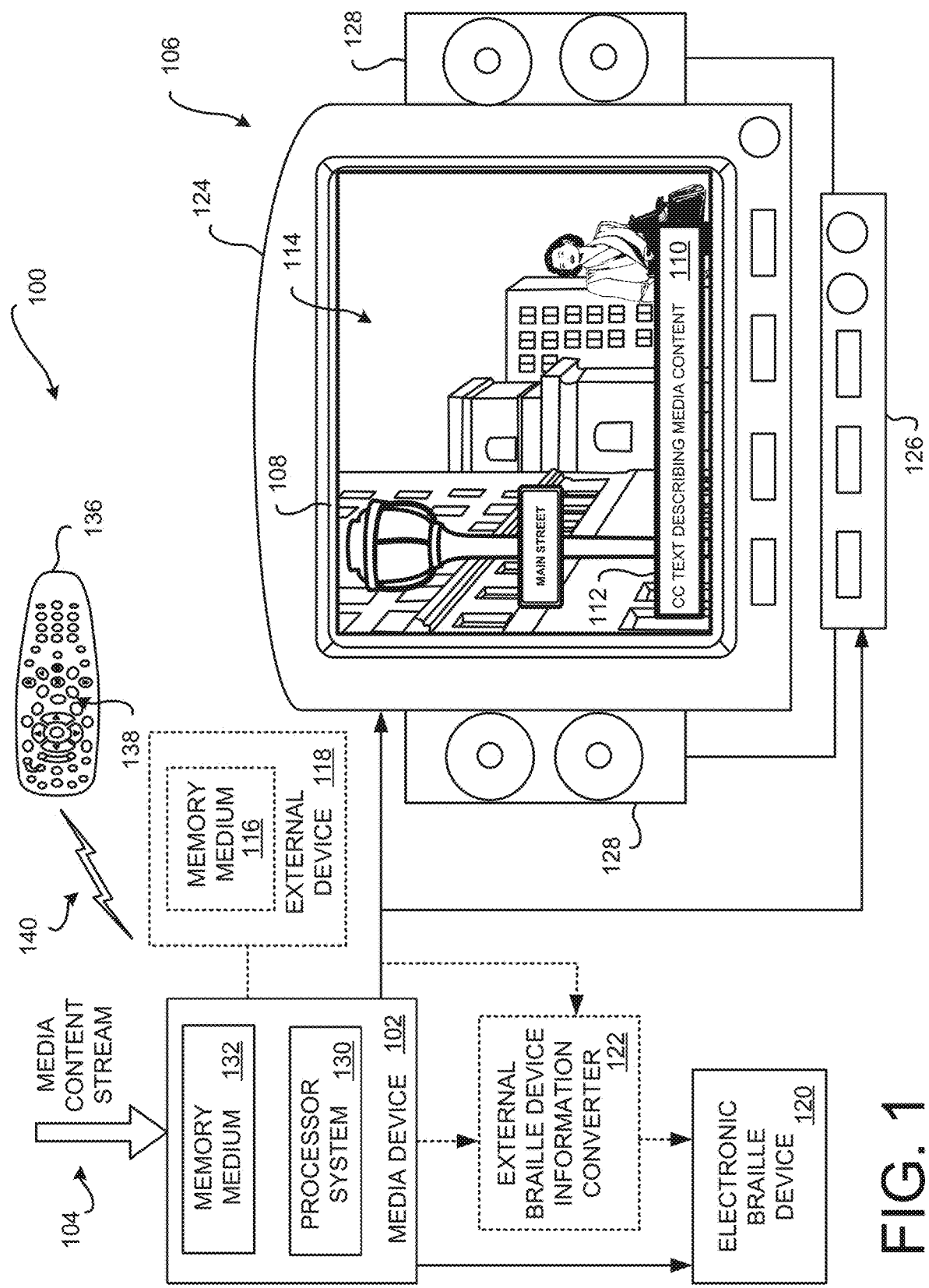
FIG. 1 is a block diagram of an embodiment of the electronic Braille device presentation system operating in an environment having a media device.

FIG. 1 is a block diagram of an embodiment of the electronic Braille device presentation system 100 operating in an environment having a media device 102. In an exemplary embodiment, the electronic Braille device presentation system 100 provides supplemental information to advise the visually impaired user of an initiation of a trick play operation and/or of an occurring or ongoing trick play operation that assists the visually impaired user to reorient themselves after the conclusion of the trick play function. Embodiments generate and communicate a supplemental Braille text information message that is based on text that indicates at least one attribute of the operation of the media device 102, wherein the supplemental Braille text information message comprises tactile information that is sensed by the visually impaired user.

Example media devices 102 include, but are not limited to, a set top box (STB) that receives broadcasting media content streams 104. Embodiments of the electronic Braille device presentation system 100 may be implemented in other media devices, such as, but not limited to digital video disc (DVD) players, digital video recorders (DVRs), game playing devices, or personal computers (PCs) that are configured to receive one or more live feed media content streams 104 that have streaming video content, streaming audio content, and optionally streaming textual information.

The streaming textual information in a received streaming media content event may be provided as a closed captioning (CC) stream having text that corresponds to the dialogue of the audio content. The text of the CC stream is optionally presented by a media presentation system 106 having a display 108 that is used to present the video content. The CC text 110 may be presented as a textual banner 112, also commonly known as a crawl, that streams (moves) the CC text 110 along the banner 112. The banner 112 may be optionally overlaid on top of the presenting scene 114 of the streaming video content.

Alternatively, or additionally, the streaming textual information may present other information of interest. For example, a textual description describing a currently presenting scene may be provided with the media content event. Supplemental information about actors, the scene set, costumes, and any other information of interest may be provided in such supplemental streaming textual information.

In practice, a broadcasting media content stream 104 received at the media device 102 may comprise one or more streaming media content events. Exemplary media content events may include movies, made-for-television program series, local programming, and/or special events. A user (not shown) is able to cause the media device 102 to store a selected media content event of interest in a memory medium 116, for example, but not limited to, a memory medium residing in the media device 102. Alternatively, or additionally, the selected program of interest may be stored in a memory medium 116 accessible by an external device 118, such as a DVD recorder, a personal computer, an Internet-connected or cloud computing server, or the like.

In some situations, a visually impaired user may be able to enjoy listening to the presenting stream of audio content. And, depending upon the degree of visual impairment, the visually impaired user may be able to discern some degree of visual information from the presenting video content shown on the display 108. Embodiments of the electronic Braille device presentation system 100 are configured to convert various streaming textual information into a stream of text-based content that is presentable on an electronic Braille device 120. This stream of text-based content is interchangeably referred to herein as "text-based Braille content." The visually impaired user may use their tactile sense to feel (detect) the text-based Braille content that is output from their electronic Braille device 120, and thereby obtain various information pertaining to a currently presenting media content event.

The electronic Braille device presentation system 100 of FIG. 1 illustrates the use of an optional external Braille device information converter 122. The external Braille device information converter 122 is configured to receive at least the streaming textual information of interest from the media device 102. The received streaming textual information is then converted into the text-based Braille content that is communicated to the electronic Braille device 120. Alternatively, the functionality of the external Braille device information converter 122 may be implemented within the media device 102 or within the electronic Braille device 120 itself.

The exemplary media device 102 is coupled to the media presentation system 106 that includes a visual display device 124, such as a television (hereafter, generically a TV), which presents the streaming video content on the display 108. The media presentation system 106 may optionally include an audio presentation device 126, such as a surround sound receiver, that presents the streaming audio content from one or more sound output devices, such as the illustrated speakers 128. Other types of output devices may also be coupled to the media device 102, including those providing any sort of stimuli sensible by a human being, such as temperature, vibration and the like.

The media device 102 includes, among other components, a processor system 130 and a memory medium 132. The memory medium 132 may be any suitable storage medium that is configured to store at least a portion of the electronic Braille device presentation system 100. The processor system 130 processes the streaming media content event in a received media content stream 104 into streaming video content, streaming audio content, and optionally streaming CC text 110 that is communicated to the components of the media presentation system 106. The processor system 130 also processes the streaming textual information that is to be communicated to the electronic Braille device 120 (or to the external Braille device information converter 122, depending upon the visually impaired user's system configuration). The electronic Braille device 120 and the external Braille device information converter 122 also include a processor system and a memory medium (not shown).

The exemplary media device 102 is configured to receive commands from a user via a remote control 136. The remote control 136 includes one or more controllers 138 disposed on the surface of the remote control 136. The user, such as the visually impaired user or another user, by actuating one or more of the controllers 138, causes the remote control 136 to generate and transmit commands to the media device 102 and/or to components of the media presentation system 106. The remote control commands are transmitted via a wireless signal 140 to the media device 102 and/or to components of the media presentation system 106. Preferably, each individual one of the controllers 138 has a specific predefined function that causes a specific operation by the media device 102 and/or by components of the media presentation system 106. Such functions may include the various trick function that control presentation of the media content event. The commands communicated from the remote control 136 then control the media device 102 and/or control components of the media presentation system 106. The wireless signal 140 may be an infrared (IR) signal or a radio frequency (RF) signal that is detectable by components of the media device 102.

The illustrated electronic Braille device 120 is a generic representation of any suitable electronic Braille device now known or later developed. These various electronic Braille devices 120 are configured to present the text-based Braille content to a visually impaired user in real time, or near real time, such that presentation of the text-based Braille content is substantially synchronized with presentation of the media content event. For example, if the streaming CC text 110 is used as the streaming textual information that is converted into the text-based Braille content that is presented by the electronic Braille device as tactile information that is sensed by the visually impaired user. The electronic Braille device 120 generally or substantially presents the Braille information in synchronization with presentation of the CC text 110 in the banner 112. (If the CC text 110 is not presented, the text-based Braille content may still be presented to the visually impaired user using their electronic Braille device 120 in synchronization with presentation of the media content event). Synchronization of the presenting text-based Braille content may be based on timing information that is used to control synchronization of the streaming video content, streaming audio content, and/or any available streaming textual information.

In view that there are many different types of electronic Braille devices 120, the various embodiments of the electronic Braille device presentation system 100 are configured to generate the text-based Braille content and/or supplemental Braille text information messages using any suitable information format. In some embodiments, the media device 102 and/or the optional external Braille device information converter 122 may be configured for communication with a particular electronic Braille device 120. Alternatively, or additionally, the media device 102 and/or the optional external Braille device information converter 122 may be configured for communication with a plurality of different electronic Braille devices 120, such that once the identity and/or data format used by the particular electronic Braille device 120 is identified or determined, the text-based Braille content can be output in a suitable format that can be used by that particular electronic Braille device 120. Information about the various output formats and/or the various electronic Braille devices 120 may be stored in the memory medium 132 of the media device 102 and/or in a memory (not shown) of the external Braille device information converter 122. Alternatively, or additionally, once the particular electronic Braille device 120 being used by the visually impaired user is identified or determined, the media device 102 and/or the optional external Braille device information converter 122 can access a remote server or the like (not shown) and access the necessary information that is needed to provide the text-based Braille content and/or supplemental Braille text information messages to the visually impaired user's electronic Braille device 120 in the required format.

Embodiments of the electronic Braille device presentation system 100 are configured to generate text-based Braille content from streaming textual information that is received in the media content stream 104. Some embodiments of the electronic Braille device presentation system 100 may be configured with a speech-to-text synthesizer that is configured to process the streaming audio content into a stream of corresponding textual information. However, equivalent legacy systems are known to also perform similar functions.

The novel features provided by embodiments of the electronic Braille device presentation system 100 that enhance presentation of a streaming media content event to a visually impaired user via their electronic Braille device 120 are to provide supplemental text-based Braille content (in addition to the legacy text-based Braille content) that provides cues to the visually impaired user that one or more trick functions are being used to control presentation of the streaming media content event, to provide cues to the visually impaired user that informs them of the effect of the trick function operation on the presentation of the streaming media content event at the conclusion of the trick function operation, and/or to provide cues that assist the visually impaired user to understand the discernible discontinuity that is perceived by the visually impaired user during an interruption of the text-based Braille content that will change abruptly when a trick function operation occurs. Here, a supplemental Braille text information message is generated that describes one or more attributes pertaining to or describing the operation at the media device 102 and/or component of the media presentation system 106. Accordingly, the presented supplemental Braille text information message provides tactile information that will assist the visually impaired user to be less confused and disoriented because of a trick function operation. Further, the visually impaired user will be more readily able to reorient themselves with respect to the continued presentation of the media content event upon conclusion of the trick function operation.

The supplemental Braille text information are predefined text-based information cues that are communicated as text-based Braille content to the visually impaired user's electronic Braille device 120. The supplemental Braille text information may be stored in the form of data or information in a memory medium, such as the memory medium 132, that is accessible by the media device 102. The supplemental Braille text information is accessed by the processor system when a trick play operation occurs, and is then communicated as a supplemental Braille text information message to the electronic Braille device 120 and/or the external Braille device information converter 122. The supplemental Braille text information message may be in a text format and/or in a Braille information format. For example, if a pause operation is initiated, the supplemental Braille text information associated with initiation of a pause operation may be accessed when the pause operation has been initiated. However, further conversion of the supplemental Braille text information may be required so that a message may be generated and communicated to the visually impaired user by their electronic Braille device 120. For example, the supplemental Braille text information message may be a specific message, such as, but not limited to, "a pause operation has been initiated." The supplemental Braille text information message indicating the pause operation (an attribute of the operation) is output from the electronic Braille device 120 in a manner that is tactilely sensed by the visually impaired user.

In some embodiments, the supplemental Braille text information message may be dependent upon the particular type of electronic Braille device 120 that the visually impaired user is using. Thus, for a particular trick play operation, the supplemental Braille text information may be the same for all electronic Braille devices 120, but the actual information communicated to the electronic Braille device 120 and/or the external Braille device information converter 122 may be somewhat different. (In some embodiments, the supplemental Braille text information and the supplemental Braille text information message may be the same information.)

In an example embodiment, a plurality of predefined text-based information cues reside in the memory medium 132 of the media device 102 (interchangeably referred to herein as the supplemental Braille text information). Alternatively, the predefined text-based information cues may reside in another memory medium, such as at the external Braille device information converter 122 and/or in another local or remote memory medium that can be accessed by the media device 102 and/or the external Braille device information converter 122. In some embodiments, a relational database is used to access and manage the plurality of different predefined text-based information cues. In such embodiments, particular ones of the supplemental Braille text information are associated with one or more of a specific trick function operation.

Each predefined text-based information cue is associated with a trick play operation. The predefined text-based information cue may have textual information that described the trick play operation. For example, a pause operation may include the text term "pause" or the like. When the pause operation is initiated, the supplemental Braille text information message having the phrase "a pause operation has been initiated" or the like may be generated in response to the initiation of the pause operation. When the pause operation ends, the same predefined text-based information cue (or a different predefined text-based information cue associated with the ending of the pause operation) may be accessed in response to the ending of the pause operation, and the supplemental Braille text information message having the phrase "a pause operation has been concluded" or the like may then be generated. In some embodiments, the predefined text-based information cues are the supplemental Braille text information messages which are accessed to generate the supplemental Braille text information message.

In practice, the media device 102 streams the media content event being received in a media content stream 104 (or from another memory medium) out to the media presentation system 106 for presentation to the users. The electronic Braille device 120 is concurrently receiving and presenting the text-based Braille content that is sensed by the visually impaired user. When a particular trick function operation is initiated, such as when a user command for a trick function is communicated to the media device from the remote control 136, the media device 102 then controls the presentation of the streaming media content event in accordance with the specified trick function operation.

In an example embodiment, concurrent to initiating and performing the trick function operation, the media device 102 accesses one of the predefined text-based information cues that are associated with the trick function operation. For example, if the trick function operation is to pause presentation of the streaming media content event, a predefined text-based information cue associated with the initiation of a pause operation is accessed and retrieved. In this example embodiment, the predefined text-based information cue is then used to generate a corresponding supplemental Braille text information message that is communicated to the electronic Braille device 120.

When the electronic Braille device 120 receives and presents the supplemental Braille text information to the visually impaired user, the visually impaired user is informed by the corresponding supplemental Braille text information message that operation of a trick function has been initiated. For example, if a pause trick function has been initiated, the supplemental Braille text information may be comprised of a suitable text message in Braille language that a pause operation is being initiated. Thus, when presentation of the text-based Braille content is interrupted by the pause operation, the visually impaired user understands that a pause operation is occurring. Thus, the visually impaired user appreciates that there is no component malfunction, that there has not been a service disruption (where the media content stream 104 is no longer being received and/or processed), and/or that a different trick function operation is not being performed. For example, the supplemental Braille text information may be used to generate a supplemental Braille text information message that presents the text "pause function is being initiated" or the like.

As the trick function operation is being implemented, the supplemental Braille text information (and/or the supplemental Braille text information message) may be repeated, or may be replaced with another supplemental Braille text information message (that is based on other predefined supplemental Braille text information) so as to inform the visually impaired user that the current trick function operation is ongoing. For example, during the duration of the pause operation, a supplemental Braille text information message may be repeated (on an ongoing basis or periodically) so that the visually impaired user understands that the trick function operation is ongoing. With respect to the example pause operation, the supplemental Braille text information message may correspond to the text "pause function continuing" or the like.

The media device 102 may, at some juncture, receive a command from the user of the remote control 136 to end or conclude the current trick function operation. In response to receiving the request to end the trick function operation, the media device 102 will then resume communication of the streaming media content event to the media presentation system 106. Concurrent with the resumption of presentation of the media content event, the streaming textual information may also then resume such that the text-based Braille content can be generated there from and then communicated to the electronic Braille device 120.

In an example embodiment, another predefined text-based information cue corresponding to the ending of the trick function operation may be optionally accessed and used to generate another supplemental Braille text information message to inform the visually impaired user of the conclusion of the current trick function operation. With respect to the example pause operation, a predefined text-based information cue associated with the conclusion of the pause operation may be accessed in response to the media device 102 receiving the user command to end the pause operation. The accessed predefined text-based information cue may then be used to generate a new supplemental Braille text information message that is communicated to the electronic Braille device 120. Here, the supplemental Braille text information message may correspond to "pause operation has ended" or the like.

Various trick functions are configured to adjust the presentation speed of the media content event and/or adjust the direction of presentation of the media content event. A fast forward trick function increases the rate or presentation of the video portion of the media content event (so that the video appears to run forward at a relatively high rate of speed in the "forward" direction). A slow motion forward trick function slows presentation of the video portion of the media content event (so that the video appears to run forward at a relatively slow or low rate of speed in the forward direction). A fast rewind trick function reverses presentation of the video portion of the media content event (so that the video appears to run backward at a relatively high rate of speed in the "reverse" direction). A slow motion rewind trick function reverses presentation of the video portion of the media content event (so that the video appears to run backward at a relatively slow rate of speed in the reverse direction). These trick functions may be referred to using other equivalent nomenclature by other media content presentation systems.

When one of these trick functions (fast forward/slow motion forward/fast rewind/slow motion rewind) are initiated, typically the corresponding audio portion of the media content event is halted. Similarly, the streaming textual information portion of the media content event is also halted (or otherwise is distorted in its presentation). Embodiments of the electronic Braille device presentation system 100 identify the initiation of one of these trick functions (fast forward/slow motion forward/fast rewind/slow motion rewind), and in response thereto, initiate generation of and communication of a supplemental Braille text information message to the electronic Braille device 120 to inform the visually impaired user that the trick function has been initiated. The supplemental Braille text information message is based on the corresponding predefined supplemental Braille text information stored in the memory medium 132 or in another accessible memory medium. For example, the supplemental Braille text information message may tell the user that "a fast forward operation has been initiated" or the like. Other suitable messages may be defined for the initiation of the other trick functions (slow motion forward/fast rewind/slow motion rewind).

While the trick function operation (fast forward/slow motion forward/fast rewind/slow motion rewind) is ongoing, some embodiments may continue to repeat a suitable supplemental Braille text information message, and/or periodically repeat a supplemental Braille text information message. The supplemental Braille text information message presented by the electronic Braille device 120 may be the same as the supplemental Braille text information message that indicates the initiation of the trick function operation, or the supplemental Braille text information message may be different to indicate to the visually impaired user that the trick function operation is continuing.

At the conclusion of the trick function operation (fast forward/slow motion forward/fast rewind/slow motion rewind), an optional supplemental Braille text information message may then be generated and communicated to the electronic Braille device 120 to indicate to the visually impaired user that the trick function operation has concluded. (In some embodiments where the concluding supplemental Braille text information message is omitted, the visually impaired user may intuitively understand that the trick function operation has ended when presentation of the text-based Braille content resumes.)

However, since the duration of such a trick function operation is variable (and concludes based on an operation by a user), the visually impaired user will not have a good intuitive understanding of how far forward or back the presentation of the media content event has changed during the trick function operation. That is, indicating that the trick function operation (fast forward/slow motion forward/fast rewind/slow motion rewind) has concluded may not be, by itself, sufficient to best assist the visually impaired user to understand "where" presentation of the media content event is resuming. For example, an initiation and the subsequent conclusion of a fast rewind operation may be indicated to the visually impaired user using appropriate supplemental Braille text information messages. However, at least to some extent, the visually impaired user may still be partially confused and disoriented until they can re-orient themselves after the conclusion of the trick function operation and figure out "where" in the media content event presentation resumed (even though they have been informed which particular one of the trick function operations have occurred and when the trick function operation ended).

Accordingly, some embodiments may further inform the visually impaired user the extent in the amount of, or the degree of, a change in presentation location of the media content event after the particular trick function operation ends. In an example embodiment, the media device 102 and/or the external Braille device information converter 122 accesses presentation time information embedded in the media content event stream that is available when the particular trick function operation is initiated. When the trick function operation concludes the presentation time information for the start time (initiation) and end time (conclusion) of the trick function operation are compared and a duration corresponding to a difference is determined (hereinafter referred to as the trick function duration information).

Based on the determined duration associated with the determined difference in the presentation time information, embodiments of the electronic Braille device presentation system 100 may optionally generate and communicate a suitable supplemental Braille text information message that indicates to the visually impaired user where the presentation of the media content event is resuming. For example, if a fast rewind operation is implemented for five seconds, based on the compared presentation start and end time information, the media device 102 and/or the external Braille device information converter 122 may determine that the media content event has been rewound by fifteen seconds of real time (assuming that the fast rewind rate is three times the normal presentation speed rate). That is, the trick function duration information is determined to be fifteen seconds of real time. Accordingly, a supplemental Braille text information message may be generated that indicates to the visually impaired user that "the fast rewind operation has rewound the media content event by fifteen seconds." Accordingly, this information will assist the visually impaired user to more quickly and more comfortably re-orient themselves after the conclusion of the fast or slow motion rewind operation.

As another example, a slow motion rewind operation may have been implemented for forty five seconds. Based on the compared presentation start and end time information, the media device 102 and/or the external Braille device information converter 122 may determine that the media content event has been rewound by fifteen seconds of real time (assuming that the slow motion rewind rate is one third times the normal presentation speed rate). Accordingly, a supplemental Braille text information message may be generated that indicates to the visually impaired user that "the slow motion rewind operation has rewound the media content event by fifteen seconds." Accordingly, this information will assist the visually impaired user to more quickly and more comfortably re-orient themselves after the conclusion of the fast or slow motion rewind operation. Fast forward and slow motion forward trick function operations may be similarly indicated to the visually impaired user on their electronic Braille device 120.

Alternatively, or additionally, metadata of the presenting media content event may also provide information to the visually impaired user that will help the visually impaired user to be less confused and disoriented until they can re-orient themselves after the conclusion of the trick function operation. For example, some metadata will include supplemental information that describe a currently presenting scene of the media content event. The scene information may be accessed from the metadata, and then used to generate and communicate a suitable supplemental Braille text information message to the electronic Braille device 120. Here, the visually impaired user may discern the supplemental scene information and more quickly re-orient themselves after the conclusion of the rewind operation.

For example, supplemental scene information in the streaming metadata may indicate a currently presenting scene is of a car chase. If the rewind trick function operation concludes at this scene, a supplemental Braille text information message indicating that the "current scene is of a car chase" or the like may be presented to the visually impaired user via their electronic Braille device 120. The visually impaired user will likely remember the previously presented car chase scene, and therefore, be able to more quickly re-orient themselves after the conclusion of the rewind operation.

Other trick function operations include the jump forward trick function operation and the jump back trick function operation. The jump forward trick function operation advances presentation of the media content event by some predefined duration, or may advance presentation up to some relevant indicator or marker (such as a scene transition marker, a chapter marker, a predefined flag, or another indicia that has been previously embedded in the media content event stream). Similarly, the jump back trick function operation rewinds presentation of the media content event by some predefined duration, or may rewind presentation up to some relevant indicator or marker (such as a scene transition marker, chapter marker, flag, or other indicia of the previously presented scenes).

Similar to the above-described process of comparing the presentation time information, a supplemental Braille text information message may be generated and communicated to the electronic Braille device 120 to inform the visually impaired user that the jump forward or jump back trick function has occurred, and the extent that the jump forward or jump back trick function operation has changed the presentation of the media content event. For example, with a jump back trick function operation with a fifteen second duration, a supplemental Braille text information message may be generated that indicates to the visually impaired user that "the jump back operation has rewound the media content event by fifteen seconds."

Alternatively, or additionally, if the jump forward or jump backward trick function operation is associated with a predefined duration, a suitable supplemental Braille text information message may be generated and communicated to the electronic Braille device 120 to inform the visually impaired user the extent of the jump forward or jump back trick function operation has changed the presentation of the media content event by the amount of the predefined duration. For example, with a jump forward trick function operation with a predefined fifteen second duration, a supplemental Braille text information message may be generated that indicates to the visually impaired user that "the jump back operation has advanced presentation of the media content event by fifteen seconds."

Embodiments of the electronic Braille device presentation system 100 may also inform the visually impaired user of other operations that may be performed by the media device 102. For example, presentation of a media content event may be ended, halted, or otherwise discontinued, such as when another user turns off or deactivates the media device 102 and/or one or more of the components of the media presentation system 106. An example embodiment may optionally sense such an operation change. Then, embodiments generate and transmit a supplemental Braille text information message that indicates to the visually impaired user that the media content event is no longer being presented, and optionally, indicates information about the nature of the operation. Thus, the visually impaired user will understand that the presentation has ended, that the media device 102 has been powered down (turned off), or that some other operation has occurred which disrupted presentation of the media content event.

As another example, a service disruption may occur in the delivery of the media content event and/or to the media content stream 104 to the media device 102. The service provider may communicate a message to the media device 102 indicating the service disruption. For example, if an emergency has occurred such that presentation of the media content event is interrupted, a textual message may be presented on the display 108. A weather related emergency notification or an "Amber Alert" are examples of such service interruptions. Embodiments of the electronic Braille device presentation system 100 may generate and communicate a corresponding supplemental Braille text information message that is presented to the visually impaired user via their electronic Braille device 120, thereby informing them of the service interruption. The supplemental Braille text information message may be based on the received streaming media content itself. Alternatively, or additionally, the supplemental Braille text information message may be based on a predefined supplemental Braille text information or cue that has been associated with such service interruptions.

In some instances, presentation of the media content event may not be paused or discontinued while the emergency situation is occurring, such as when an important public announcement is made. For example, a text banner or crawl providing the notification may be presented on the display 108. Some embodiments of the electronic Braille device presentation system 100 may generate and communicate a corresponding supplemental Braille text information message that is presented to the visually impaired user via their electronic Braille device 120, thereby informing them of the public message. Alternatively, or additionally, the supplemental Braille text information may correspond to the contents of the emergency message text being presented in the text banner or crawl.

From time to time, presentation of media content will change from one channel to a different channel (where a particular media content event is presented on the first channel, and a different media content event is being presented on the different channel). Generally, this type of operation is referred to as a channel change operation in the arts. The channel change may be initiated by a user using their remote control 136. Alternatively, the channel change selection may be made by the user via an electronic program guide (EPG) being presented on the display 108.

When a channel change event occurs, embodiments of the electronic Braille device presentation system 100 may optionally generate and communicate a corresponding supplemental Braille text information message that is presented to the visually impaired user via their electronic Braille device 120 informing them of the channel change operation. IN some embodiments, the supplemental Braille text information message may optionally specify the new (changed to) channel identifier. Additionally, or alternatively, the supplemental Braille text information message may optionally specify information (an attribute) about the newly presenting media content event being presented on the new channel. Such information may be available from the EPG information that is accessible by the media device 102. For example, the title of the media content event and/or other descriptive information may be retrieved from the stored EPG information and/or from the received metadata, and then be included in the supplemental Braille text information message that is presented to the visually impaired user via their electronic Braille device 120.

Another media device operation is the muting of the audio output. During an audio mute operation, audio output is halted while presentation of the video content continues. Here, a supplemental Braille text information message may be optionally generated and communicated to the electronic Braille device 120 so that the visually impaired user is informed that an audio mute operation is occurring.

Any suitable supplemental Braille text information message may be generated by the various embodiments of the electronic Braille device presentation system 100 so that the visually impaired user is informed about a trick function operation or another media device operation or event via their electronic Braille device 120. That is, there is no limitation regarding the particular descriptive text that is used to generate a supplemental Braille text information message.

During presentation of a media content event, the stream of audio content must be synchronously presented with the stream of video content. If closed captioning text and/or other supplemental information is provided in the streaming media content event, the closed captioning text and/or other supplemental information must also be synchronized with the presentation of the video stream and/or the audio stream. Synchronization between the various streams of information is facilitated by the use of presentation time stamps or other time-related synchronization information. When the received media content stream 104 is being processed, interchangeably referred to as decoding, the presentation time stamps facilitates the decoding of a plurality of elementary streams (video, audio, closed captioning text and/or other supplemental information) such that presentation of the plurality of streams are synchronized by adjusting the decoding of plurality of streams to a common master time base. (Alternatively, some of the content streams may be adjusting by having their decoding match to the decoding of a designated stream.). The master time base may be one of the plurality of decoders' clocks, the data source's clock, or it may be based on some external clock.

In the various embodiments, the text-based Braille content is also synchronized to presentation of the audio and video streams of the media content event. Thus, when a trick play operation occurs that adjusts presentation of the video portion of the presenting media content event, presentation of all of the other streams of content (audio, closed captioning text, other supplemental information, and/or text-based Braille content) can be synchronized to the video content when presentation of the media content event resumes after the conclusion of the trick play operation.

Embodiments of the electronic Braille device presentation system 100 use the presentation time stamps or other time-related synchronization information to determine when and what type of information in a supplemental Braille text information message will be generated and communicated to the electronic Braille device 120. For example, when the trick play operation is initiated (depending on the particular type of trick play operation), the presentation time stamp or other time-related synchronization information of the latest currently presented image frame of the video content (or of another content stream) is accessed and is stored. Then, at the conclusion of the trick play operation, the presentation time stamp or other time-related synchronization information of the video frame beginning with the resuming media content presentation is accessed (and optionally saved). By comparing the presentation time stamps or other time-related synchronization information (from the initiation of the trick play operation and from the conclusion of the trick play operation and/or the resumption of presentation of the media content), information about the change in presentation of the media content event can be determined.

For example, a time difference between the presentation time stamps or other time-related synchronization information can be used to determine a duration of change in the presentation location of the media content event, such as might be caused by a fast forward, a slow motion forward, a fast rewind, or a slow motion rewind trick play operation, or other operations that involve a temporal aspect to the operation, such as a mute operation. Information corresponding to this determined duration may be included in the supplemental Braille text information message. (In some situations, such as a pause operation, a channel change operation, or the like, the presentation time stamps or other time-related synchronization information are not required to determine the information that is communicated in a supplemental Braille text information message.)

Alternatively, or additionally, other embodiments may determine durations associated with trick play operations using other processes and/or devices. For example, a clock or other time measuring device (not shown) may be used to determine a duration of a pause operation. The duration of a change in presentation of the media content event that is associated with fast forward/slow motion forward/fast rewind/slow motion rewind trick play operations may be based on a time duration measured by a clock or the like, and based on other predefined information (such as a known rate of presentation change of the fast forward/slow motion forward/fast rewind/slow motion rewind trick play operations).

Figure 2:
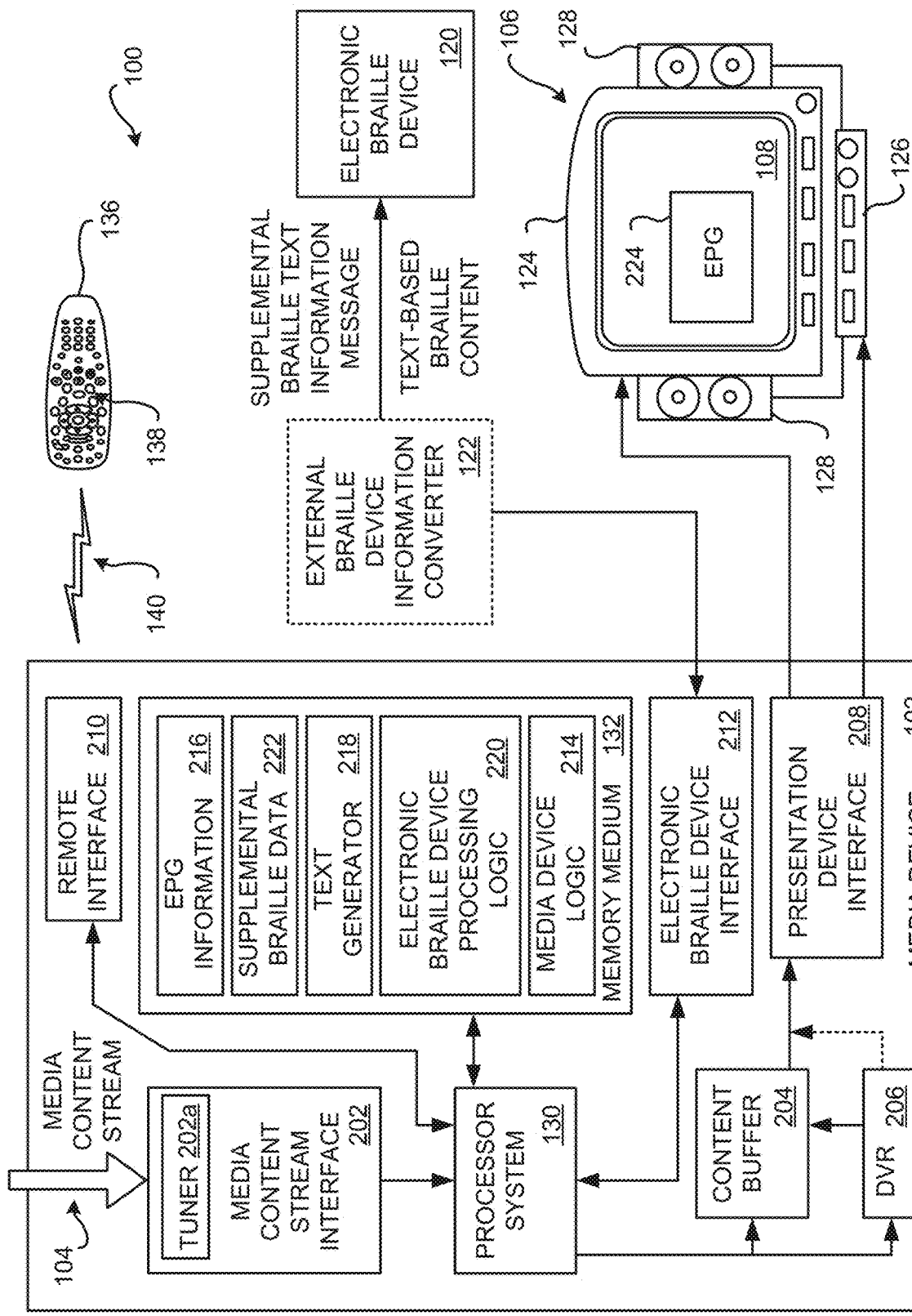
FIG. 2 is a block diagram of an electronic Braille device presentation system that is operable to control a media device.

FIG. 2 is a block diagram of an electronic Braille device presentation system 100 that is operable to control a media device 102, such as, but not limited to, a set top box (STB). Embodiments of the electronic Braille device presentation system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 104.

The non-limiting exemplary media device 102 comprises a processor system 130, a memory medium 132, a media content stream interface 202, a content buffer 204, an optional digital video recorder (DVR) 206, a presentation device interface 208, a remote interface 210, and an electronic Braille device interface 212. The memory medium 132 comprises portions for storing the media device logic 214, the electronic program guide (EPG) information 216, an optional text generator 218, the electronic Braille device processing logic 220, and the supplemental Braille data 222. In some embodiments, the media device logic 214, the optional text generator 218, and/or the electronic Braille device processing logic 220 may be integrated together, and/or may be integrated with other logic. In other embodiments, some or all of these memory and other data manipulation functions may be provided by using a remote server or other electronic devices suitably connected via the Internet or otherwise to a client device. Other media devices 102 may include some, or may omit some, of the above-described media processing components. Further, additional components not described herein may be included in alternative embodiments.

The electronic Braille device interface 212 is configured to communicatively couple the media device 102 to the electronic Braille device 120. Alternatively, or additionally, the electronic Braille device interface 212 may be configured to communicatively couple the media device 102 to the external Braille device information converter 122 (which is then coupled to the electronic Braille device 120). The electronic Braille device interface 212 may employ a physical connector, such as a wire pair, a coaxial cable, a high definition multimedia interface (HDMI) cable, a fiber optic cable or the like to connect to the electronic Braille device 120 (and/or to the external Braille device information converter 122). The electronic Braille device interface 212 may have multiple connection couplers to facilitate different types of physical connectors that may be selected during system configuration. Such connectors may also be configured to communicatively couple the media device 102 to other types of electronic devices as is known in the arts. Alternatively, or additionally, the electronic Braille device interface 212 may employ a wireless signal interface that may employ a radio frequency (RC) and/or infrared signal.

As noted above, a user (not shown) may operate their remote control 136 to control presentation of a media content event. That is, based upon the user generated commands, the media device 102 can then control itself and the various components of the media presentation system 106 in accordance with the generated user commands. Initiation and control of the various available trick play operations may be controlled by the user via their remote control 136.

The functionality of the media device 102, here a set top box, is now broadly described. In a satellite broadcast system, a media content provider provides media content that is received in one or more multiple media content streams 104 multiplexed together in one or more transport channels. The transport channels with the media content streams 104 are communicated to the media device 102 from a media system sourced from a remote head end facility (not shown) operated by the media content provider. The media device 102 is configured to receive one or more broadcasted satellite signals detected by an antenna (not shown). Non-limiting examples of other media systems that broadcast a media content stream 104 include a cable system, a radio frequency (RF) communication system, and the Internet. Alternatively, the media content stream 104 can be received from an external memory medium 116 (FIG. 1).

The one or more media content streams 104 are received by the media content stream interface 202. In some broadcast environments, one or more tuners 202a in the media content stream interface 202 selectively tune to one of the media content streams 104 in accordance with instructions received from the processor system 130. The processor system 130, executing the media device logic 214 and based upon a request for a media content event of interest specified by a user, parses out media content associated with the media content event of interest. The media content event of interest is then assembled into a stream of video and/or audio information which may be stored by the content buffer 204 such that the media content, generically referred to as demultiplexing and decoding. The buffered media content can then be streamed out to components of the media presentation system 106, such as the visual display device 124 and/or the audio presentation device 126, via the presentation device interface 208 at a controlled rate so that the media content is provided at a desired rate to the components of the media presentation system 106. Alternatively, or additionally, the parsed out media content may be saved into the DVR 206 for later presentation. The DVR 206 may be directly provided in, locally connected to, or remotely connected to, the media device 102.

From time to time, information populating the EPG information 216 portion of the memory medium 132 is communicated to the media device 102, via the media content stream 104 or via another suitable media. The EPG information 216 portion of the memory medium 132 stores the information pertaining to the scheduled programming for media content events. The EPG information may include, but is not limited to, a scheduled presentation start and/or end time, a program channel, and descriptive information. The media content event's descriptive information may include the title of the media content event, names of performers or actors, date of creation, and/or a summary describing the nature of the media content event. Any suitable information may be included in the media content event's supplemental information. Upon receipt of a command from the user requesting presentation of an EPG display, the information in the EPG information 216 is retrieved, formatted, and then presented on the display 108 as an EPG 224.

Typically, the EPG 224 has the look and feel of a table with program information describing available media content events and/or channels that are currently being broadcast to the media device 102 in the available indicated channels. The information shown on the EPG 224 is based on the stored EPG information 216, and may include the title of available media content events, along with the scheduled time and date of the media content event presentation. A brief description of the media content events may also be provided on the EPG 224. The EPG menu 224 typically indicates the "channel" of the available media content event. The channel identifies the originating source of the program, such as a television studio, a premium movie provider, a national program provider, etc.

As noted above, a user (not shown) may select from among the various media content events that are indicated on the EPG 224. That is, based upon the user commands, typically generated at and transmitted from the remote control 136 as a wireless signal 140 that is received by the remote interface 210, the media device 102 can then control itself and/or other various media devices that it is communicatively coupled to so that an available media content event is accessed, processed and presented in accordance with the generated user commands.

For example, if a particular media content event of interest is scheduled to begin, or is currently available, the user may select the media content event of interest for immediate presentation on the display 108 by navigating to the region of the EPG 224 that indicates the media content event. One of the controllers 138 on the remote control 136 is then actuated by the user to select that particular media content event. In response to the user selection, the tuner 202a tunes itself to receive the media content stream 104 having the channel associated with the selected media content event. The received media content in the tuned-to channel is then processed and stored into the content buffer 204. The buffered media content event is then streamed out from the content buffer 204 to the components of the media presentation system 106 in a continuous and uninterrupted manner. In the various embodiments, a supplemental Braille text information message indicating the channel change (and optionally other information of interest) may be generated and communicated to the electronic Braille device 120 to inform the visually impaired user of the channel change.

The processes performed by the media device 102 relating to the processing of received user commands (and in particular, trick play operation type commands), the processing of the received media content stream 104, and the communication of a presentable media content event to the components of the media presentation system 106 are generally implemented by the processor system 130 while executing the media device logic 214. Thus, the media device 102 may perform a variety of functions related to the processing and presentation of one or more media content events received in the media content stream 104. The processes performed by the media device 102 relating to the generation and communication of the supplemental Braille text information messages are generally implemented by the processor system 130 while executing the electronic Braille device processing logic 220.

Additionally, some embodiments may be optionally configured to accessing supplemental information describing at least one characteristic of a currently presenting scene of the media content event that is being presented after the trick play operation has ended. For example, but not limited to, scene description information may be available in the meta data or the like. The supplemental Braille text information message may incorporate this scene description information so as to inform the visually impaired user about the scene that is being presented when presentation of the media content event resumes after the conclusion of the current operation.

The optional text generator 218 is configured to process portions of available streaming media content event to determine supplemental Braille text information that might be incorporated into a generated supplemental Braille text information message. For example, if a closed captioning stream is not provided in a currently presenting media content event, the text generator 218 may be configured to process the audio stream portion of the media content event and generate a stream of text corresponding to the dialogue of the audio portion of the media content event. This generated text stream may then be converted into text-based Braille content that is communicated to the electronic Braille device 120 for output to the visually impaired user.

Alternatively, or additionally, the text generator 218 may be configured to selectively identify portions of a presented image for text. The identified text (which is a type of scene description information) may then be converted into a short text stream by the text generator 218, and then communicated to the electronic Braille device 120 (by the processor system 130 executing the electronic Braille device processing logic 220) as a supplemental Braille text information message. For example, the presenting scene 114 of the streaming video content (FIG. 1) illustrates a lady looking upwards towards a street sign with the text "Main Street" thereon. The text generator 218 may be configured to identify this street sign, generate a string of text ("main street") and then communicate the information to the electronic Braille device 120 in a supplemental Braille text information message. Thus, the visually impaired user will be informed of the example street name shown in the scene.

Embodiments of the electronic Braille device presentation system 100 may be configured to selectively identify any textual information that is included in the video portion of the media content event. Although such textual discrimination and identification technologies are known, embodiments of the electronic Braille device presentation system 100 take this textual-based information and communicate such information in a supplemental Braille text information message, along with other text-based Braille content (such as closed captioning content or the like). Thus, if a scene transition is initiated by a jump forward or jump back trick play operation, and in the event that the resumed presented video content includes relevant text in the presented video images, the visually impaired user may be informed of this relevant text in the image. Accordingly, this information will assist the visually impaired user to more quickly and more comfortably re-orient themselves after the conclusion of the trick play operation.

In practice, the use of the external Braille device information converter 122 may be optional. For example, the external Braille device information converter 122 may not be used if the particular media device 102 embodied with the electronic Braille device presentation system 100 is directly coupled to the electronic Braille device 120. Here, the media device 102 is configured to communicate the text-based Braille content and any generated supplemental Braille text information messages in a textual information stream to the electronic Braille device 120 in a format that the electronic Braille device 120 may use for the processing and generation of the tactile information that is presented to the visually impaired user. Then, the media device generates and communicates the supplemental Braille text information messages directly to the electronic Braille device 120 in response to trick play operations.

In other situations, the media device 102 is communicatively coupled to the electronic Braille device 120 via the external Braille device information converter 122. Here, the media device 102 provides the text-based Braille content of the media content event and any supplemental Braille text information messages (in response to trick play operations) to the external Braille device information converter 122. The external Braille device information converter 122 then processes and communicates this information in the particular format that is used by the visually impaired user's electronic Braille device 120. Such an embodiment of the external Braille device information converter 122 enables operation of embodiments of the electronic Braille device presentation system 100 implemented in the media device 102 to provide the supplemental Braille text information messages (and the text-based Braille content) to any variety of different types of electronic Braille devices 120, wherein the external Braille device information converter 122 operates as a "translator" that provides the needed output format that is required by the particular external Braille device information converter 122 being used by the visually impaired user.

Figure 3:
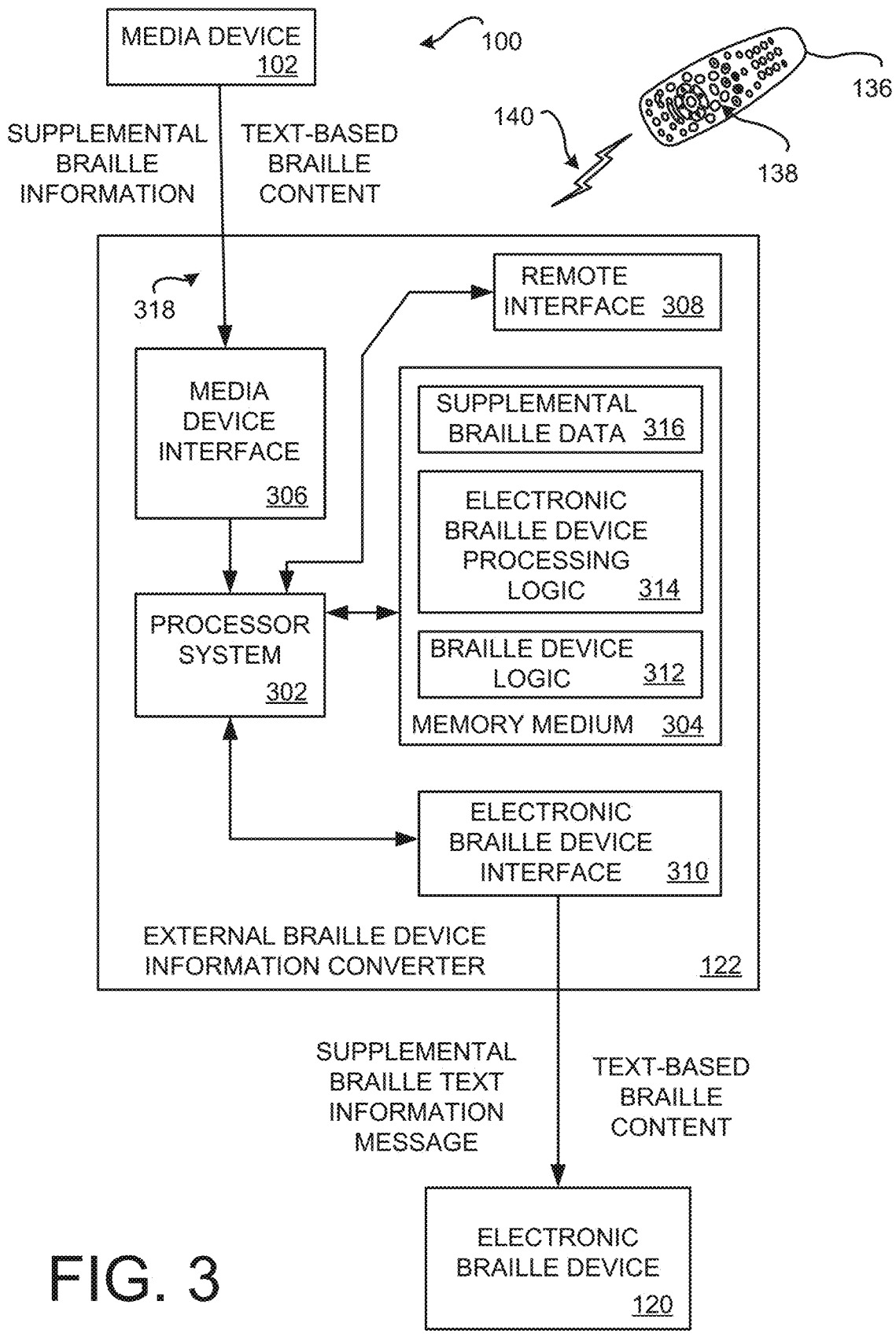
FIG. 3 is a block diagram of an embodiment of the electronic Braille device presentation system embodiment operable to control an external Braille device information converter.

In yet another situation, the electronic Braille device presentation system 100 is implemented in the media device 102 and in the external Braille device information converter 122. This embodiment is generically illustrated in FIG. 3. FIG. 3 is a block diagram of an embodiment of the electronic Braille device presentation system embodiment operable to control an external Braille device information converter 122. The non-limiting exemplary external Braille device information converter 122 comprises a processor system 302, a memory medium 304, a media device interface 306, an optional remote interface 308, and an electronic Braille device interface 310. The media device interface 306, and the electronic Braille device interface 310 may be configured as described above for the electronic Braille device interface 212. The memory medium 304 comprises portions for storing the Braille device logic 312, the electronic Braille device processing logic 314, and the supplemental Braille data 316. In some embodiments, the Braille device logic 312 and/or the electronic Braille device processing logic 314 may be integrated together, and/or may be integrated with other logic. In other embodiments, some or all of these memory and other data manipulation functions may be provided by using a remote server or other electronic devices suitably connected via the Internet or otherwise to a client device. Other electronic Braille devices 120 may include some, or may omit some, of the above-described media processing components. Further, additional components not described herein may be included in alternative embodiments.

In a first embodiment, the media device 102 communicates the text-based Braille content from the media content event to the external Braille device information converter 122, which then processes and formats the text-based Braille content as needed by the particular electronic Braille device 120. When a trick play operation occurs, the media device 102 generates and communicates information about the particular trick play operation. Here, the supplemental Braille text information message has not been generated or provided by the media device 102.

For example, if a pause trick play operation is initiated, the media device 102 generates and communicates a first notification, interchangeably referred to herein as the supplemental Braille information 318, to the external Braille device information converter 122. In response to receiving the first notification (of the example pause operation), the external Braille device information converter 122 access information from the supplemental Braille data 316 which is used to generate the corresponding supplemental Braille text information message indicating initiation of the pause operation. The supplemental Braille text information message is then communicated to the electronic Braille device 120 so that the visually impaired user is informed of the pause operation. The external Braille device information converter 122 may optionally continue to communicate this supplemental Braille text information message (or another related supplemental Braille text information message) on a continuous basis or periodic basis during the duration of the pause operation.

In response to the end of the pause operation, a second notification is generated and communicated from the media device 102 to the external Braille device information converter 122. When the second notification is received from the media device 102, the external Braille device information converter 122 then generates and communicates a supplemental Braille text information message indicating that the pause operation has concluded. Then, the communication of the text-based Braille content from the external Braille device information converter 122 to the electronic Braille device 120 may resume.

As another example, if one of a fast forward, a slow motion forward, a fast rewind, or a slow motion rewind trick play operation is initiated, the media device 102 generates and communicates a first notification to the external Braille device information converter 122. In response to the end of the operation (fast forward/slow motion forward/fast rewind/slow motion rewind), a second notification is generated and communicated from the media device 102 to the external Braille device information converter 122. The media device 102 may also include first timing information (and/or supplemental information) associated with presentation of the media content event at the time that the operation was initiated and second timing information (and/or supplemental information) associated with the resumed presentation of the media content event.

In response to receiving the first notification (of the example fast forward/slow motion forward/fast rewind/slow motion rewind trick play operation), the external Braille device information converter 122 accesses information from the supplemental Braille data 316 which is used to generate the corresponding supplemental Braille text information message indicating initiation of the trick play operation. The supplemental Braille text information message is then communicated to the electronic Braille device 120 so that the visually impaired user is informed of the trick play operation (fast forward/slow motion forward/fast rewind/slow motion rewind). The external Braille device information converter 122 may optionally continue to communicate this supplemental Braille text information message (or another related supplemental Braille text information message) on a continuous basis or periodic basis during the duration of the trick play operation. When the second notification is received from the media device 102, the external Braille device information converter 122 then generates and communicates a supplemental Braille text information message indicating that the trick play operation has concluded. Further, supplemental information describing the resumed point of presentation may also be determined from the received timing information (and/or supplemental information), which is added into the supplemental Braille text information message. Then, the communication of the text-based Braille content from the external Braille device information converter 122 to the electronic Braille device 120 may resume.

As yet another example, if one of a jump forward or a jump backward trick play operation is initiated, the media device 102 generates and communicates a first notification to the external Braille device information converter 122. The media device 102 may also include timing information, duration information, and/or supplemental information associated with duration of the jump forward or jump backward trick play operation.

In response to receiving the first notification (of the example jump forward or jump backward trick play operation), the external Braille device information converter 122 accesses information from the supplemental Braille data 316 which is used to generate the corresponding supplemental Braille text information message indicating initiation of the trick play operation. The supplemental Braille text information message is then communicated to the electronic Braille device 120 so that the visually impaired user is informed of the trick play operation (jump forward or jump backward). Further, supplemental information describing the duration of the jump forward or jump backward trick play operation, and/or information associated with the resumed point of presentation, may also be included in the supplemental Braille text information message. Then, the communication of the text-based Braille content from the external Braille device information converter 122 to the electronic Braille device 120 may resume.

If a channel change operation occurs, the media device 102 may communicate information identifying the new channel, the title of the new media content event, and/or other information of interest to the external Braille device information converter 122. The external Braille device information converter 122 then generates and/or communicates an appropriate supplemental Braille text information message to the electronic Braille device 120. Then, the communication of the text-based Braille content of the new media content event from the external Braille device information converter 122 to the electronic Braille device 120 may resume.

Similarly, if another operation occurs at the media device and/or one of the components of the media presentation system 106 (such as a powering down or a failure of the media device 102 or another component of the media presentation system 106, a service interruption in the delivery and receipt of the media content stream 104, or an audio mute operation), the media device 102 may communicate a suitable message to the external Braille device information converter 122. Based on this information, the external Braille device information converter 122 may generate and communicate a corresponding supplemental Braille text information message to the electronic Braille device 120 so as to inform the visually impaired user of the occurring operation.

In yet another situation, the electronic Braille device presentation system 100 is implemented in the media device 102 and in the external Braille device information converter 122, wherein the external Braille device information converter 122 further includes a remote interface 308. This embodiment is also generically illustrated in FIG. 3.

In this example embodiment, the external Braille device information converter 122 is configured to detect the same user commands, via the remote interface 308, that are issued from the remote control 136. When such remote control commands are received by the media device 102 and/or component of the media presentation system 106, the media device 102 and/or component of the media presentation system 106 implements the command. Here, if the user initiates a particular trick play operation or other operation using their remote control 136, the external Braille device information converter 122 may detect the user command, and then generate and communicate a corresponding supplemental Braille text information message to the external Braille device information converter 122. Such an embodiment may be particularly suited to enabling operation of the electronic Braille device presentation system 100 using a legacy media device 102 that does not have an embodiment of the electronic Braille device presentation system 100 implemented therein.

In some embodiments, a generated supplemental Braille text information message is inserted into the stream of information that is being communicated to the electronic Braille device 120 or the external Braille device information converter 122. The subsequent or following text-based Braille content is resumed after insertion of the supplemental Braille text information message. Conceptually, the text-based Braille content is "paused" for the duration of the supplemental Braille text information message, and then is resumed. The presentation rate of the continued text-based Braille content may be increased so as to result in a resynchronization of the continuing text-based Braille content with the presentation of the media content event at some point in time, such as a few second or minutes.

Alternatively, the inserted supplemental Braille text information message may overwrite or otherwise replace the text-based Braille content. That is, embodiments insert the supplemental Braille text information message into the steam of text-based Braille content such that the supplemental Braille text information message replaces the corresponding portion of the text-based Braille content. Although there may be a perceptible gap in the text-based Braille content, presentation of the intervening supplemental Braille text information message has a higher informational value to the visually impaired user.

In some embodiments, some types of supplemental Braille text information messages are inserted over (overwriting) the text-based Braille content, while other types of supplemental Braille text information messages are inserted into the stream while the text-based Braille content is paused. Such combination systems may overwrite the text-based Braille content when the duration of the supplemental Braille text information message is relatively short and/or if the information in the supplemental Braille text information message is relatively important to the visually impaired user.

In embodiments of the electronic Braille device presentation system 100 that employ the external Braille device information converter 122, information associated with the trick function operations may be managed in a variety of different manners. In an example embodiment, the media device 102 accesses and communicates the predefined text-based information cue associated with a particular trick function operation to the external Braille device information converter 122. Here, the external Braille device information converter 122 generates the supplemental Braille text information message that is presented by the electronic Braille device 120. Alternatively, the media device 102 may generate the supplemental Braille text information message and insert the message into the streaming textual information that is being communicated to the external Braille device information converter 122. Such an embodiment is easily integrated for operation with a legacy external Braille device information converter or even a legacy electronic Braille device 120. In another embodiment, the media device 102 communicates information describing the trick function operation. Here, the external Braille device information converter 122 accesses the associated predefined text-based information cue in response to receiving the information from the media device 102 about the current trick function operation.

In some applications, the electronic Braille device 120 and external Braille device information converter 122 are integrated together into a single electronic device that is communicatively coupled to the media device 102. The media device 102 may generate and communicate the supplemental Braille text information messages to the integrated electronic device. Alternatively, the media device 102 may communicate information corresponding to a particular trick function operation that is being implemented by the media device 102. The integrated electronic device may then generate the corresponding supplemental Braille text information messages.

In another embodiment, the external Braille device information converter 122 is configured to monitor one or more of the streaming video content, streaming audio content, and/or any available streaming textual information. Such an embodiment of the electronic Braille device presentation system 100 may be advantageously used with a legacy media device and/or media presentation system 106. The embodiment is simply installed between the media device 102 receiving the media content and one or more of the components of the media presentation system 106.

When a change in the streaming video content, streaming audio content, and/or any available streaming textual information is detected, the external Braille device information converter 122 determines the nature of the change of media content presentation to determine which particular trick function operation is being currently performed. For example, if the video portion of the streaming media content event is paused, a single image frame is typically presented on the display 108 during the duration of the pause operation. When the continuous presentation of the single video frame is detected by the external Braille device information converter 122, then the external Braille device information converter 122 determines that the current trick function operation is a pause operation. Alternatively, or additionally, the external Braille device information converter 122 may sense a halt in the movement of one or more motion vectors of the presenting video frames. When presentation resumes with changes in presented video frames, the external Braille device information converter 122 determines that the pause operation has ended.

If a fast or slow forward trick function operation is implemented, the video portion of the presentation of the streaming media content event is presented at a faster rate (such as by deleting particular video frames and/or presenting the video frames on the display 108 for a shorter duration). Here, the external Braille device information converter 122 may sense a change in the speed of movement of one or more motion vectors of the presenting video frames. An increase in the speed of the movement of motion vectors may be associated with a fast forward trick function operation. If the speed of movement of the motion vectors decreases, the external Braille device information converter 122 may determine that a slow forward motion trick function operation is being performed by the media device 102.

If a fast or slow rewind trick function operation is implemented, the video portion of the presentation of the streaming media content event is presented in a reverse direction of presentation. Here, the external Braille device information converter 122 may sense a change in the speed and direction of the movement of one or more motion vectors of the presenting video frames. An increase in the speed with a reverse in direction of the movement of motion vectors may be associated with a fast rewind trick function operation. If the speed of movement of the motion vectors decreases with a reverse in direction, the external Braille device information converter 122 may determine that a slow rewind motion trick function operation is being performed by the media device 102.

If a jump forward or jump backward trick function has been implemented, the electronic Braille device presentation system 100 may monitor various presentation timing and synchronous information in the streaming video content, streaming audio content, and/or any available streaming textual information that is being output from the media device 102. An abrupt change in the timing and synchronous information would enable the external Braille device information converter 122 to determine that a jump forward or a jump backward trick function operation has occurred.

Some embodiments of the electronic Braille device presentation system 100 may be optionally configured to inform the visually impaired user of various operations when they actuate (operate) one or more of the of the controllers 138 on the remote control 136 which are associated with a trick play function (or another operation that effects presentation of the media content event). The embodiment can postpone the trick play operation or other operation for some short predefined duration before implementing the operation (so that visually impaired user may prepare themselves for the pending operation). Further, such a delay may provide the visually impaired user the chance to cancel the operation before it is implemented by the media device 102 and/or components of the media presentation system 106. Some embodiments may require confirmation by the visually impaired user before operation is implemented. The notification of the pending operation may be provided in a supplemental Braille text information message. Alternatively, or additionally, information describing the pending operation may be audibly communicated to the visually impaired user using the audio components of the media presentation system 106.

Some embodiments of the electronic Braille device presentation system 100 may be optionally configured to access information from a presenting EPG 224 (FIG. 2). For example, if a particular channel and/or media content event is highlighted by the user on the presenting EPG 224, the channel identifier, title of the media content event, and/or other information of interest may be used to generate a supplemental Braille text information. Here, the textual EPG information from the presenting EPG 224 is accessed and is then converted into supplemental Braille text information that is used for a supplemental Braille text information message.

It should be emphasized that the above-described embodiments of the electronic Braille device presentation system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that communicates information about media device operations to an electronic Braille device, the method comprising:

receiving a media content event at a media device;

presenting the media content event with at least one component of a media content presentation system to at least one visually impaired user;

communicating a stream of text-based Braille content comprised of information that is received in the media content event from the media device to the electronic Braille device, wherein the text-based Braille content describes the media content event;

generating a supplemental Braille text information message in response to an operation of the media device that affects the presentation of the media content event, wherein the supplemental Braille text information message is based on text that indicates at least one attribute of the operation of the media device;

communicating the supplemental Braille text information message to the electronic Braille device, wherein the supplemental Braille text information message is presented by the electronic Braille device as tactile information that is sensed by the visually impaired user, and wherein the supplemental Braille text information message is inserted into the stream of text-based Braille content for a duration of a pause operation; and resuming communication of the text-based Braille content after the supplemental Braille text information message has been communicated to the electronic Braille device.

2. The method of claim 1, wherein the operation is a trick play operation performed by the media device, wherein the trick play operation comprises at least one selected from a group consisting of the pause operation, a jump forward operation, a jump backward operation, a fast forward operation, a slow motion forward operation, a fast rewind operation and a slow motion rewind operation.

3. The method of claim 1, wherein the operation performed by the media device is the pause operation, and wherein the generating and communicating comprise:

generating the supplemental Braille text information message in response to an initiation of the pause operation, wherein the pause operation pauses the presentation of the media content event, and wherein the supplemental Braille text information message is based on text that indicates the initiation of the pause operation of the media device; and communicating the supplemental Braille text information message to the electronic Braille device, wherein the supplemental Braille text information message informs the visually impaired user that the pause operation has been initiated at the media presentation device.

4. The method of claim 3, wherein the generated supplemental Braille text information message is a first supplemental Braille text information message, and further comprising:

generating a second supplemental Braille text information message in response to a continuation of the pause operation at the media device, wherein the second supplemental Braille text information message is based on text that indicates the pause operation of the media device is continuing to be performed by the media device; and communicating the second supplemental Braille text information message to the electronic Braille device, wherein the second supplemental Braille text information message is presented by the electronic Braille device as tactile information that is sensed by the visually impaired user to inform the user that the pause operation is continuing to be performed by the media device, wherein the second supplemental Braille text information message is periodically generated and communicated during the duration of the pause operation to periodically inform the visually impaired user that the pause operation is continuing at the media presentation device.

5. The method of claim 3, wherein the generated supplemental Braille text information message is a first supplemental Braille text information message, and further comprising:

generating a second supplemental Braille text information message in response to an ending of the pause operation at the media device, wherein the second supplemental Braille text information message is based on text that indicates the pause operation of the media device has ended; and communicating the second supplemental Braille text information message to the electronic Braille device, wherein the second supplemental Braille text information message informs the visually impaired user that the pause operation of the media device has ended.

6. The method of claim 1, wherein the operation performed by the media device is a trick play operation that is one of a fast forward operation, a slow motion forward operation, a fast rewind operation and a slow motion rewind operation, wherein the trick play operation changes at least one of a rate of presentation and a direction of presentation of the media content event, and wherein the generating and communicating comprise:

generating the supplemental Braille text information message in response to an initiation of the trick play operation, and wherein the supplemental Braille text information message is based on text that indicates the initiation of the trick play operation of the media device and indicates that the trick play operation is one of the fast forward operation, the slow motion forward operation, the fast rewind operation and the slow motion rewind operation; and communicating the supplemental Braille text information message to the electronic Braille device, wherein the supplemental Braille text information informs the visually impaired user that one of the fast forward operation, the slow motion forward operation, the fast rewind operation and the slow motion rewind operation has been initiated at the media device.

7. The method of claim 6, wherein the generated supplemental Braille text information message is a first supplemental Braille text information message, and further comprising:

generating a second supplemental Braille text information message in response to a continuation of the trick play operation at the media device, wherein the second supplemental Braille text information message is based on text that indicates the trick play operation of the media device is continuing to be performed by the media device; and communicating the second supplemental Braille text information message to the electronic Braille device, wherein the second supplemental Braille text information message informs the visually impaired user that the trick play operation is continuing to be performed by the media device, wherein the second supplemental Braille text information message is periodically generated and communicated during the duration of the trick play operation so that the visually impaired user understands that the trick play operation is continuing at the media presentation device.

8. The method of claim 6, wherein the generated supplemental Braille text information message is a first supplemental Braille text information message, and further comprising:
generating a second supplemental Braille text information message in response to an ending of the trick play operation at the media device; and
communicating the second supplemental Braille text information message to the electronic Braille device, wherein the second supplemental Braille text information message informs the visually impaired user that the fast forward operation, the slow motion forward operation, the fast rewind operation or the slow motion rewind operation has ended.

9. The method of claim 8, further comprising:
accessing first information corresponding to the time of the initiation of the trick play operation;
accessing second information corresponding to the time of the end of the trick play operation; and
determining a duration based on a difference between the first information and the second information,
wherein the duration defines a change in presentation time of the media content event, wherein the second supplemental Braille text information message includes the duration, and
wherein the second supplemental Braille text information message informs the user of the duration of the change of the presentation time of the media content event after the conclusion of the trick play operation.

10. The method of claim 9, further comprising:
accessing scene description information describing at least one characteristic of a currently presenting scene of the media content event that is being presented after the trick play operation has ended,
wherein the second supplemental Braille text information message includes the scene description information, and
wherein the scene description information included in the second supplemental Braille text information message informs the user about the currently presenting scene of the media content event.

11. The method of claim 1, wherein the operation performed by the media device is one of a jump forward operation or a jump backward operation, wherein the jump forward operation advances presentation of the media content by a predefined first duration, wherein the jump backward operation rewinds presentation of the media content event by a predefined second duration, and wherein the generating and communicating comprise:
generating the supplemental Braille text information message in response to an initiation of the jump forward operation or the jump backward operation, wherein the supplemental Braille text information message is based on text that indicates the initiation of the jump forward operation or the jump backward operation; and
communicating the supplemental Braille text information message to the electronic Braille device,
wherein the supplemental Braille text information message informs the visually impaired user that the jump forward operation or the jump backward operation has been initiated at the media presentation device,
wherein the supplemental Braille text information message informs the visually impaired user of the predefined first duration when the jump forward operation occurs, and
wherein the supplemental Braille text information message informs the visually impaired user of the predefined second duration when the jump backward operation occurs.

12. The method of claim 11, further comprising:
accessing scene description information describing at least one characteristic of a currently presenting scene of the media content event that is being presented after the jump forward operation or the jump backward operation has occurred,
wherein the supplemental Braille text information message includes the scene description information, and
wherein the scene description information included in the supplemental Braille text information message informs the user about the currently presenting scene of the media content event.

13. The method of claim 1, wherein the operation performed by the media device is a power down operation performed by the media device or at least one component of the media presentation system that is presenting the media content event, and wherein the generating and communicating comprise:
generating the supplemental Braille text information message in response to an initiation of the power down operation,
wherein the supplemental Braille text information message is based on text that informs the visually impaired user of the power down operation.

14. The method of claim 1, further comprising generating the supplemental Braille text information message in response to a failure to receive the media content event at the media device, wherein the supplemental Braille text information message is based on text that informs the visually impaired user of a service disruption in the communication of the media content event to the media device.

15. The method of claim 1, wherein the operation performed by the media device is a channel change operation performed by the media device that changes presentation from a first media content event that is currently being presented to a second media content event, and wherein the generating and communicating comprise:
generating the supplemental Braille text information message in response to an initiation of the channel change operation,
wherein the supplemental Braille text information message is based on text that informs the visually impaired user of the channel change operation and describes at least one attribute of the second media content event.

* * * * *